(12) United States Patent
Harding

(10) Patent No.: US 10,393,022 B2
(45) Date of Patent: Aug. 27, 2019

(54) COOLED COMPONENT HAVING EFFUSION COOLING APERTURES

(71) Applicant: ROLLS-ROYCE plc, London (GB)

(72) Inventor: Adrian L Harding, Derby (GB)

(73) Assignee: ROLLS-ROYCE plc, London (GB)

( * ) Notice: Subject to any disclaimer, the term of this patent is extended or adjusted under 35 U.S.C. 154(b) by 261 days.

(21) Appl. No.: 15/339,630

(22) Filed: Oct. 31, 2016

(65) Prior Publication Data
US 2017/0298823 A1   Oct. 19, 2017

(30) Foreign Application Priority Data
Nov. 30, 2015   (GB) .................................. 1521077.6

(51) Int. Cl.
*F23R 3/06*   (2006.01)
*F02C 7/12*   (2006.01)
(Continued)

(52) U.S. Cl.
CPC ................ *F02C 7/12* (2013.01); *F01D 5/185* (2013.01); *F01D 5/186* (2013.01); *F01D 5/187* (2013.01);
(Continued)

(58) Field of Classification Search
CPC .... F23R 3/16; F23R 3/002; F23R 3/06; F23R 2900/03041; F23R 2900/03044; F23R 2900/03042; F01D 5/18; F01D 5/186
See application file for complete search history.

(56) References Cited

U.S. PATENT DOCUMENTS 4,574,451 A * 3/1986 Smashey ................. B23P 15/04
164/132
8,777,570 B1   7/2014 Liang
(Continued)

FOREIGN PATENT DOCUMENTS

EP   2 905 538 A1   8/2015
EP   3 006 831 A1   4/2016
(Continued)

OTHER PUBLICATIONS

May 13, 2016 Search Report issued in British Patent Application No. 1521077.6.
(Continued)

*Primary Examiner* — Steven M Sutherland
(74) *Attorney, Agent, or Firm* — Oliff PLC (57) ABSTRACT

A cooled gas turbine engine component includes a wall having a plurality of effusion cooling apertures extending there-through from a first surface to a second surface. Each aperture has an inlet in the first surface and an outlet in the second surface. Each aperture includes an inlet portion, a collection chamber, a metering portion, a U-shaped bend portion and a diffusing portion arranged in flow series from the inlet to the outlet. The inlet portion of each aperture is arranged substantially perpendicularly to a surface of the collection chamber. The metering portion of each aperture is arranged to extend longitudinally from a first lateral side of the collection chamber and the diffusing portion of each aperture is arranged at an angle to the second surface. Each outlet has a quadrilateral shape in the second surface of the wall and each outlet is displaced laterally from the metering portion.

26 Claims, 9 Drawing Sheets

(51) Int. Cl.
  *F01D 5/18* (2006.01)
  *F01D 25/10* (2006.01)
  *F01D 25/12* (2006.01)
  *F01D 9/04* (2006.01)
  *F02C 7/24* (2006.01)
  *F23R 3/00* (2006.01)

(52) U.S. Cl.
  CPC ............... *F01D 9/04* (2013.01); *F01D 25/10* (2013.01); *F01D 25/12* (2013.01); *F02C 7/24* (2013.01); *F23R 3/005* (2013.01); *F23R 3/06* (2013.01); *F05D 2220/32* (2013.01); *F05D 2230/22* (2013.01); *F05D 2230/31* (2013.01); *F05D 2240/35* (2013.01); *F05D 2240/36* (2013.01); *F05D 2260/20* (2013.01); *F05D 2260/202* (2013.01); *F05D 2260/204* (2013.01); *F23R 2900/03042* (2013.01); *F23R 2900/03043* (2013.01); *F23R 2900/03044* (2013.01)

(56) References Cited

U.S. PATENT DOCUMENTS

| | | | | |
|---|---|---|---|---|
| 2012/0051941 | A1* | 3/2012 | Bunker | ............... F01D 5/186 |
| | | | | 416/97 R |
| 2015/0226433 | A1* | 8/2015 | Dudebout | ............... F23R 3/16 |
| | | | | 60/752 |

FOREIGN PATENT DOCUMENTS

| | | |
|---|---|---|
| EP | 3 015 648 A1 | 5/2016 |
| GB | 2 202 907 A | 10/1988 |

OTHER PUBLICATIONS

Mar. 21, 2017 Search Report issued in European Patent Application No. 16 19 6583.

* cited by examiner

COOLED COMPONENT HAVING EFFUSION COOLING APERTURES

The present disclosure relates to a cooled component and in particular to a cooled component of a gas turbine engine.

Components, for example turbine blades, turbine vanes, combustion chamber walls, of gas turbine engines and other turbomachines are cooled to maintain the component at a temperature where the material properties of the component are not adversely affected and the working life and the integrity of the component is maintained.

One method of cooling components, turbine blades, turbine vanes combustion chamber walls, of gas turbine engines provides a film of coolant on an outer surface of a wall of the component. The film of coolant is provided on the outer surface of the wall of the component by a plurality of effusion cooling apertures which are either arranged perpendicular to the outer surface of the wall or at an angle to the outer surface of the wall. The effusion apertures are generally manufactured by laser drilling, but other processes may be used, e.g. electro-chemical machining, electro-discharge machining or by casting. Effusion cooling apertures are often cylindrical and angled in the direction of flow of hot fluid over the outer surface of the component. Angled effusion cooling apertures have an increased internal surface area, compared to effusion cooling apertures arranged perpendicular to the outer surface of the wall of the component, and the increased internal surface area increases the heat transfer from the wall of the component to the coolant. Angled effusion apertures provide a film of coolant on the outer surface of the component which has improved quality compared to effusion cooling apertures arranged perpendicular to the outer surface of the wall of the component.

However, despite the use of cylindrical effusion cooling apertures angled in the direction of flow of hot fluid over the surface of the component, the coolant passing through the cylindrical effusion cooling apertures often retains a significant component of velocity in direction perpendicular to the surface of the component. This causes the jets of coolant exiting the cylindrical effusion cooling apertures to detach from the surface of the component and results in a poor film of coolant on the surface of the component. The high velocity of the jets of coolant also increases the mixing between the coolant and the hot fluid flowing over, or a hot fluid adjacent to, the surface of the component and this raises the temperature of the film of coolant and therefore reduces its cooling effect. Additionally there may be relatively large distances between adjacent effusion cooling apertures and this may result in a film of coolant which is non-uniform across the surface of the component and hence there may be hot spots on the surface of the component between effusion cooling apertures.

The use of a larger number of smaller diameter effusion cooling apertures, compared to a smaller number of larger diameter effusion cooling apertures, may be used to increase the internal surface area of the angled effusion apertures for the same total mass flow of coolant. However, it is expensive and time consuming to drill a large number of effusion cooling apertures using conventional manufacturing techniques, e.g. laser drilling, electro-chemical machining or electro-discharge machining.

The use of fanned effusion cooling apertures provides enhanced film cooling effectiveness, but fanned effusion cooling apertures have un-aerodynamic diffusion which suffers from flow separation and reduces its cooling effect.

According to a first aspect of the invention there is provided a cooled component comprising a wall having a first surface and a second surface, the wall having a plurality of effusion cooling apertures extending there-through from the first surface to the second surface, each effusion cooling aperture having an inlet in the first surface and an outlet in the second surface, each effusion cooling aperture comprising an inlet portion, a collection chamber, a metering portion, a U-shaped bend portion and a diffusing portion arranged in flow series from the inlet to the outlet, the inlet portion of each effusion cooling aperture being arranged substantially perpendicularly to a surface of the collection chamber, the metering portion of each effusion cooling aperture being arranged to extend longitudinally from a first lateral side of the collection chamber, the diffusing portion of each effusion cooling aperture being arranged at an angle to the second surface, each outlet having a quadrilateral shape in the plane of the second surface of the wall and each outlet being displaced laterally from the metering portion.

The outlet of each effusion cooling aperture may be downstream of the U-shaped bend portion. The metering portion of each effusion cooling aperture may comprise a longitudinally upstream extending portion. The U-shaped bend portion of each effusion cooling aperture may be the most upstream portion of the effusion cooling aperture. The inlet portion of each effusion cooling aperture may be arranged at an acute angle to the surface of the collection chamber. The outlet of the U-shaped bend portion of each effusion cooling aperture is displaced laterally from the respective metering portion.

Each collection chamber may have a circular cross-section.

Each inlet portion may be aligned with the axis of the circular cross-section collection chamber.

The metering portion of each effusion cooling aperture may be arranged to extend substantially tangentially from the collection chamber.

The diffusing portion and the collection chamber of each effusion cooling aperture may be arranged at the same lateral side of the metering portion of the effusion cooling aperture.

The diffusing portion and the collection chamber of each effusion cooling aperture may be arranged at opposite lateral sides of the metering portion of the effusion cooling aperture.

The diffusing portion of at least one effusion cooling apertures may be arranged laterally between the metering portion of the at least one effusion cooling aperture and the metering portion of a laterally adjacent effusion cooling aperture.

The diffusing portion of each one of a plurality of effusion cooling apertures may be arranged laterally between the metering portion of the respective one of the effusion cooling apertures and the metering portion of a laterally adjacent effusion cooling aperture.

The metering portion of at least one effusion cooling apertures may be arranged laterally between the diffusing portion of the at least one effusion cooling aperture and the diffusing portion of a laterally adjacent effusion cooling aperture.

The metering portion of each one of a plurality of effusion cooling apertures may be arranged laterally between the diffusing portion of the respective one of the effusion cooling apertures and the diffusing portion of a laterally adjacent effusion cooling aperture.

Each outlet may have a rectangular shape, a square shape, a parallelogram shape, a rhombus shape or an isosceles trapezium shape.

Each outlet may have a rectangular shape, each outlet is arranged such that two of the sides of the rectangular shape extend laterally and two of the sides of the rectangular shape extend longitudinally.

Each outlet may have a rhombus shape or an isosceles trapezium shape, each outlet is arranged such that two of the sides of the shape extend laterally and two of the sides of the rectangular shape extend longitudinally and laterally.

Each outlet may have a fan shape in the plane of the second surface of the wall.

The effusion cooling apertures may be arranged in longitudinally spaced rows and the apertures in each row being laterally spaced apart.

The effusion cooling apertures in each row may be offset laterally from the effusion cooling apertures in each adjacent row.

The first surface may be corrugated and the corrugations are longitudinally spaced.

The corrugations may be axially spaced.

The U-shaped bend portion of each effusion cooling aperture may be aligned longitudinally with a corresponding one of the corrugations in the first surface of the wall.

The U-shaped bend portion of each effusion cooling aperture may be aligned axially with a corresponding one of the corrugations in the first surface of the wall.

The inlets of some of the effusion cooling apertures may be arranged between corrugations in the first surface of the wall. The collection chambers of some of the effusion cooling apertures may be arranged between the corrugations in the first surface of the wall.

The inlets of some of the effusion cooling apertures may be arranged in the corrugations in the first surface of the wall. The collection chambers of some of the effusion cooling apertures may be aligned with the corrugations in the first surface of the wall.

The metering portion of each one of a plurality of the effusion cooling apertures may be connected to a common plenum chamber and the diffusing portion of each one of the plurality of the effusion apertures is connected to the common plenum chamber.

The cooled component may be a turbine blade, a turbine vane, a combustion chamber wall, a combustion chamber tile, a combustion chamber heat shield, a combustion chamber wall segment or a turbine shroud.

The cooled component may comprise a superalloy, for example a nickel based superalloy, a cobalt based superalloy or an iron based superalloy.

The cooled component may be manufactured by additive layer manufacturing, for example by direct laser deposition, powder bed laser deposition, selective laser sintering or selective laser melting.

The cooled component may be a gas turbine engine component or other turbomachine component, e.g. a steam turbine, or an internal combustion engine etc.

The gas turbine engine may be an aero gas turbine engine, an industrial gas turbine engine, a marine gas turbine engine or an automotive gas turbine engine. The aero gas turbine engine may be a turbofan gas turbine engine, a turbo-shaft gas turbine engine, a turbo-propeller gas turbine engine or a turbojet gas turbine engine.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
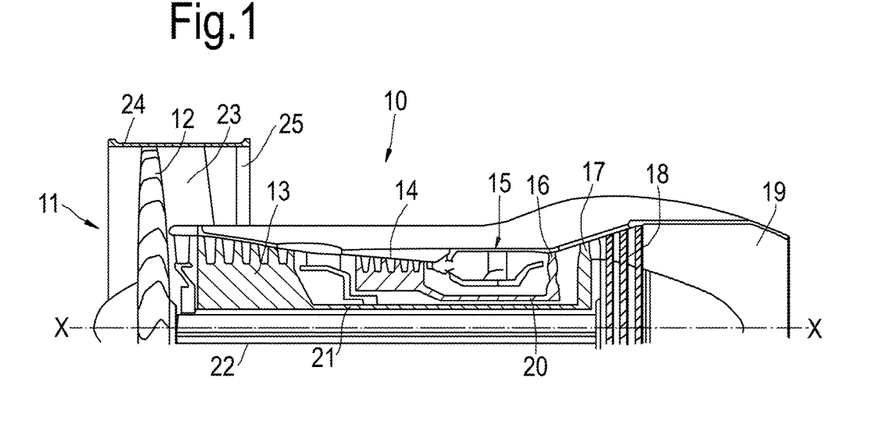
FIG. 1 is partially cut away view of a turbofan gas turbine engine having a cooled combustion chamber wall according to the present disclosure.

With reference to FIG. 1, a gas turbine engine is generally indicated at 10, having a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A fan nacelle 24 generally surrounds the fan 12 and defines the intake 11 and a fan duct 23. The fan nacelle 24 is secured to the core engine by fan outlet guide vanes 25.

The gas turbine engine 10 works in the conventional manner so that air entering the intake 11 is compressed by the fan 12 to produce two air flows: a first air flow into the intermediate pressure compressor 13 and a second air flow which passes through the bypass duct 23 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, the intermediate pressure compressor 13 and the fan 12, each by suitable interconnecting shaft 20, 21 and 22 respectively.

Figure 2:
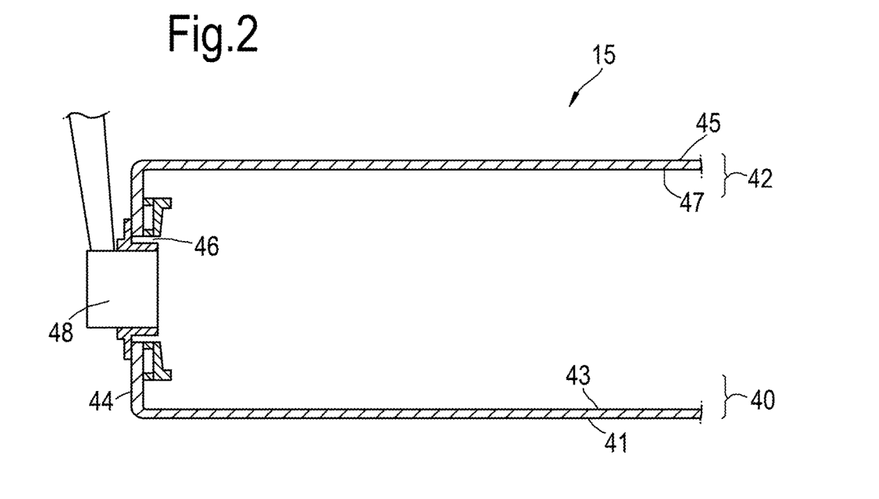
FIG. 2 is an enlarged cross-sectional view of a cooled combustion chamber wall according to the present disclosure.

The combustion chamber 15, as shown more clearly in FIG. 2, is an annular combustion chamber and comprises a radially inner annular wall 40, a radially outer annular wall structure 42 and an upstream end wall 44. The upstream end of the radially inner annular wall 40 is secured to the upstream end wall structure 44 and the upstream end of the radially outer annular wall 42 is secured to the upstream end wall 44. The upstream end wall 44 has a plurality of circumferentially spaced apertures 46 and each aperture 46 has a respective one of a plurality of fuel injectors 48 located therein. The fuel injectors 48 are arranged to supply fuel into the annular combustion chamber 15 during operation of the gas turbine engine 10 and as mentioned above the fuel is burnt in air supplied into the combustion chamber 15.

The radially inner annular wall 40 and the radially outer annular wall 42 are cooled components of the turbofan gas turbine engine 10. The radially inner annular wall 40 has a first surface 41 and a second surface 43 and similarly the radially outer annular wall 42 has a first surface 45 and a second surface 47.

Figure 3:
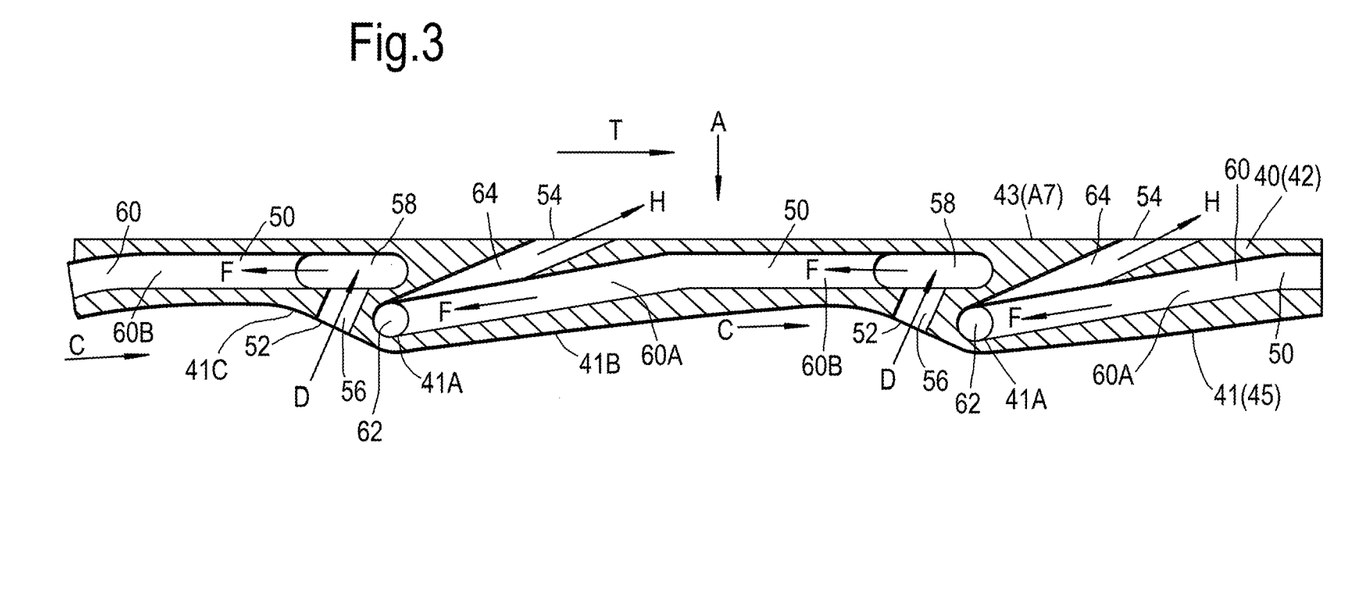
FIG. 3 is an enlarged cross-sectional view through the cooled combustion chamber wall shown in FIG. 2.
Figure 4:
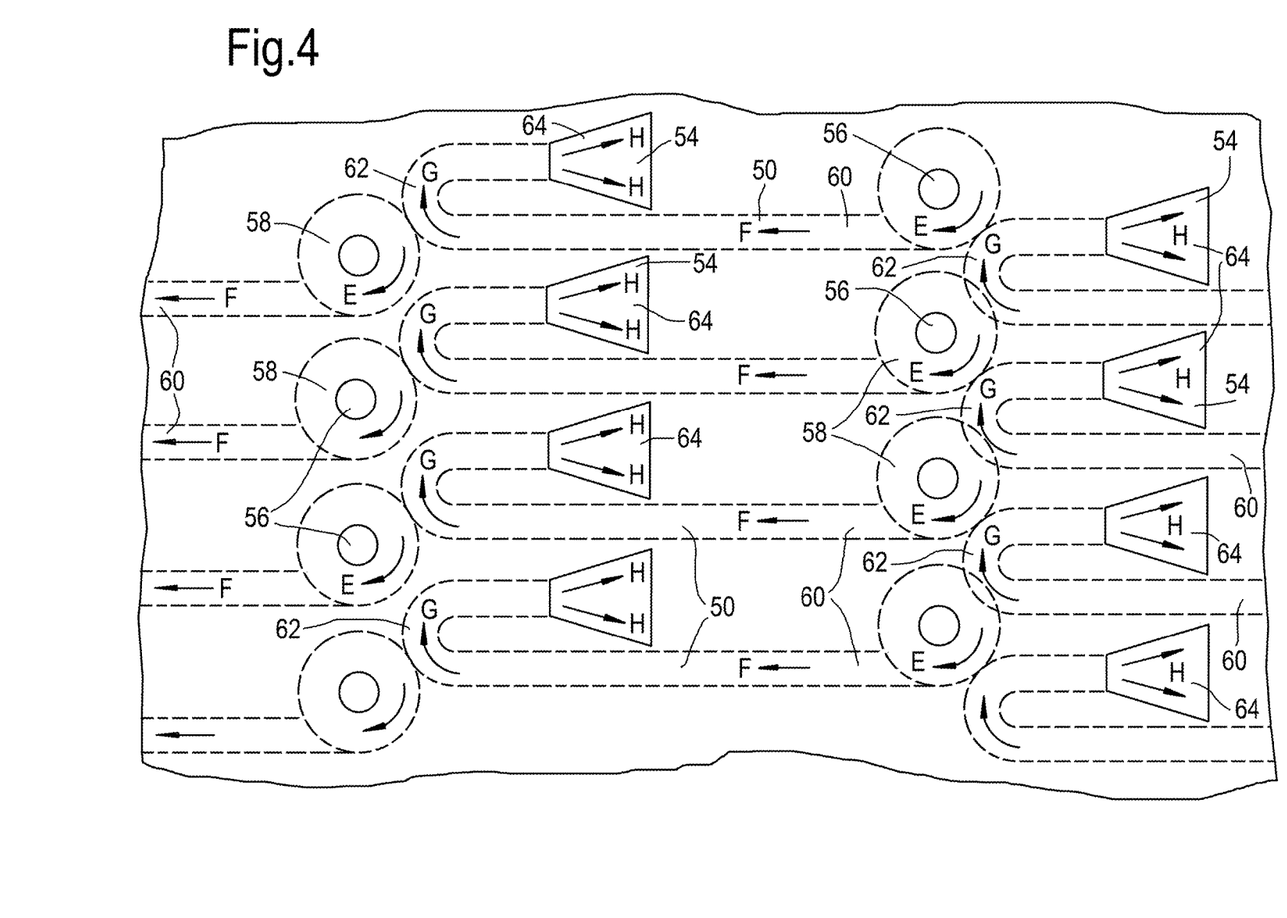
FIG. 4 is a view of the cooled combustion chamber wall in the direction of arrow A in FIG. 3.

The radially inner annular wall 40 has a plurality of effusion cooling apertures 50 extending there-through from the first surface 41 to the second surface 43, as shown more clearly in FIGS. 3 and 4. Each effusion cooling aperture 50 has an inlet 52 in the first surface 41 and an outlet 54 in the second surface 43, as shown in FIG. 3. Each effusion cooling aperture 50 comprising an inlet portion 56, a collection chamber 58, a metering portion 60, a U-shaped bend portion 62 and a diffusing portion 64 arranged in flow series from the inlet 52 to the outlet 54. The effusion cooling apertures 50 are arranged in longitudinally spaced rows and the apertures 50 in each row are laterally spaced apart and in particular the effusion cooling apertures 50 are arranged in axially spaced rows and the apertures 50 in each row are circumferentially spaced apart. The effusion cooling apertures 50 in each row are offset laterally from the effusion cooling apertures 50 in each adjacent row and in particular the effusion cooling apertures 50 in each row are offset circumferentially from the effusion cooling apertures 50 in each adjacent row.

The metering portion 60 of each effusion cooling aperture 50 extends in a longitudinally, axially, upstream direction from the respective collection chamber 58 to the U-shaped bend portion 62 of the effusion cooling aperture 50. The outlet of the U-shaped bend portion 62 of each effusion cooling aperture 50 extends in longitudinally, axially, downstream direction to the respective diffusing portion 64 of the effusion cooling aperture 50, as shown in FIGS. 3 and 4.

The first surface 41 of the radially inner annular wall 40 is corrugated and the corrugations 41A are longitudinally, axially, spaced and the corrugations 41A extend laterally, circumferentially, of the radially inner annular wall 40. The corrugations 41A are regions where the first surface 41 of the radially inner annular wall 40 is curved to a maximum distance from the second surface 43 of the radially inner annular wall 40.

The U-shaped bend portion 62 of each effusion cooling aperture 50 is aligned longitudinally, axially, with a corresponding one of the corrugations 41A in the first surface 41. In particular the U-shaped bend portion 62 of each effusion cooling aperture 50 is aligned longitudinally, axially, with the point of an associated corrugation 41A which is at a maximum distance from the second surface 43 of the radially inner annular wall 40. The U-shaped bend portion 62 of each effusion cooling aperture 50 is the most upstream portion of the effusion cooling aperture 50.

A first portion 60A of the metering portion 60 of each effusion cooling aperture 50 joining and adjacent to the respective U-shaped portion 62 is arranged substantially parallel with a portion 41B of the first surface 41 of the radially inner annular wall 40 forming the corrugation 41A and a second portion 60B of the metering portion 60 of each effusion cooling aperture 50 joining and adjacent to the respective collection chamber 58 is arranged substantially parallel with the first and second surfaces 41 and 43 respectively.

The collection chamber 58 of each effusion cooling aperture 50 is aligned longitudinally, axially, with a corresponding one of the corrugations 41A in the first surface 41. In particular a portion of the collection chamber 58 of each effusion cooling aperture 50 is aligned longitudinally, axially, with the point of an associated corrugation 41A which is at a maximum distance from the second surface 43 of the radially inner annular wall 40. The collection chamber 58 of each effusion cooling aperture 50 is the most downstream portion of the effusion cooling aperture 50. It is to be noted that the collection chambers 58 in each row of effusion cooling apertures 50, except for the last row of effusion cooling apertures 50, are arranged in the same corrugation 41A as the U-shaped bend portions 62 of a downstream row of effusion cooling apertures 50. It is also to be noted that the collection chambers 58 in each row of effusion cooling apertures 50, except for the last row of effusion cooling apertures 50, are arranged between the U-shaped bend portions 62 of a downstream row of effusion cooling apertures 50 and the second surface 43.

The inlet portion 56 of each effusion cooling aperture 50 is connected to the associated collection chamber 58 substantially at a middle region of the collection chamber 58. In this example the inlet portion 56 of each effusion cooling aperture 50 is connected to the associated collection chamber 58 such that the middle of the inlet portion 56 and the middle of the collection chamber 58 are aligned. In this particular example each collection chamber 58 has a circular cross-section and the inlet portion 56 of each effusion cooling aperture 50 is aligned with the axis of the collection chamber 58. The inlet portion 56 of each effusion cooling aperture 50 extends from a surface 41C of the respective corrugation 41A to the corresponding collection chamber 58 and the inlet portion 58 of each effusion cooling aperture 50 is arranged at an acute angle to the axis of the collection chamber 58. Each collection chamber 58 has two surfaces arranged parallel to the second surface 43. The metering portion 60 of each effusion cooling aperture 50 is arranged to extend longitudinally from a first lateral side of the collection chamber 58 and in particular the metering portion 60 of each effusion cooling aperture 50 extends substantially tangentially from the respective collection chamber 58.

The diffusing portion 64 of each effusion cooling aperture 50 is arranged at an angle to the second surface 43 and each outlet 54 has a fan shape and each outlet 54 has a quadrilateral shape in the plane of the second surface 43 of the wall 40 and the outlet 54 of each effusion cooling aperture 50 is displaced laterally, circumferentially, from the respective metering portion 60. The outlet 54 of each effusion cooling aperture 50 is designed to aerodynamically blend from the diffusing portion 54 to the second surface 43.

It is to be noted that the diffusing portion 64 and the collection chamber 58 of each effusion cooling aperture 50 are arranged at the same lateral, circumferential, side of the metering portion 60 of the effusion cooling aperture 50 and hence the outlet 54 and the inlet 56 of each effusion cooling aperture 50 are arranged at the same lateral, circumferential, side of the metering portion 60 of the effusion cooling aperture 50. The diffusing portion 64 of each effusion cooling aperture 50 is arranged laterally, circumferentially, between the metering portion 60 of the respective one of the effusion cooling apertures 50 and the metering portion 60 of a laterally, circumferentially, adjacent effusion cooling aperture 50. Also, the metering portion 60 each effusion cooling aperture 50 is arranged laterally, circumferentially, between the diffusing portion 64 of the respective one of the effusion cooling apertures 50 and the diffusing portion 64 of a laterally, circumferentially, adjacent effusion cooling aperture 50.

The U-shaped bend portion 62 of each effusion cooling aperture 50 turns through 180° from a longitudinally, axially, upstream direction to a longitudinally, axially, downstream direction and also the U-shaped bend portion 62 of each effusion cooling aperture 60 turns from a direction away from the surface 43 to a direction towards the surface 43.

It is to be noted that the inlet 52 of each effusion cooling aperture 50 is longitudinally, axially, downstream of the U-shaped bend portion 62 of the effusion cooling aperture 50 and the outlet 54 of each effusion cooling aperture 50 is longitudinally, axially, downstream of the U-shaped bend portion 62 of the effusion cooling aperture 50.

The diffusing portion 64 of each effusion cooling aperture 50 is arranged at an angle of between and including 10° and 30° to the second surface 43.

In this example the inlet portion 56, the metering portion 60 and the U-shaped bend portion 62 of the effusion cooling apertures 50 are circular in cross section.

In operation the hot combustion gases in the combustion chamber 15 flow generally from left to right as denoted by arrow T and coolant, for example air, C flows over the first surface 41 of the wall 40 flows D through the inlets 52 and inlet portions 56 of the effusion cooling apertures 50 and into the respective collection chambers 58. The coolant flow D through the inlet portions 56 is directed to impinge upon the opposite surface of collection chambers 58 to provide internal impingement cooling of the wall 40 at these positions. The coolant flow D is directed at an acute angle to the axis of the collection chambers 58 so that the coolant flows E around the collection chambers 58 and then the coolant flows F in a tangential direction from the collection chambers 58 and into the metering portions 60. The coolant flow G is turned though 180° in the U-bend portions 62 and is then the coolant flow H is directed and diffused by the diffusion portions 64 thought the outlets 54 onto and over the second surface 43 of the wall 40 to provide a film of coolant on the second surface 43 of the wall 40. It is also to be noted that the coolant flow is turned through 180° in flowing through the inlet portion 56 and the collection chamber 58 to the metering portion 60 of each effusion cooling aperture 50.

The collection chambers 58 are positioned downstream of the outlets 54 at a longitudinal, axial, distance from the outlet 54 where the effectiveness of the film of coolant from the outlets 54 is reducing so as try to maintain a more even metal temperature at the second surface 43 of the wall 40. The circular collection chambers 58 are used to maximise the effect of the impingement cooling on the wall 40 to generate as much turbulence as possible in the collection chambers 58 to aid cooling effectiveness. The metering portions 60 start from sides of the collection chambers 58 to help induce some swirl in the coolant flow in the collection chambers 58 to prevent the formation of dead zones. Dead zones are zones in which any debris in the coolant flow may collect and if the debris is suddenly displaced from a dead zone it may collect elsewhere in the effusion cooling aperture 50 and block the effusion cooling aperture 50. The length of the metering portions 60 may be selected so that the distance between the outlets 54 provides a more even temperature distribution using the collection chambers 58 to provide additional impingement cooling downstream of the effusion cooling aperture 50 outlets 54.

The arrangement described with reference to FIGS. 3 and 4 may also be used for the radially outer annular wall 42.

Figure 5:
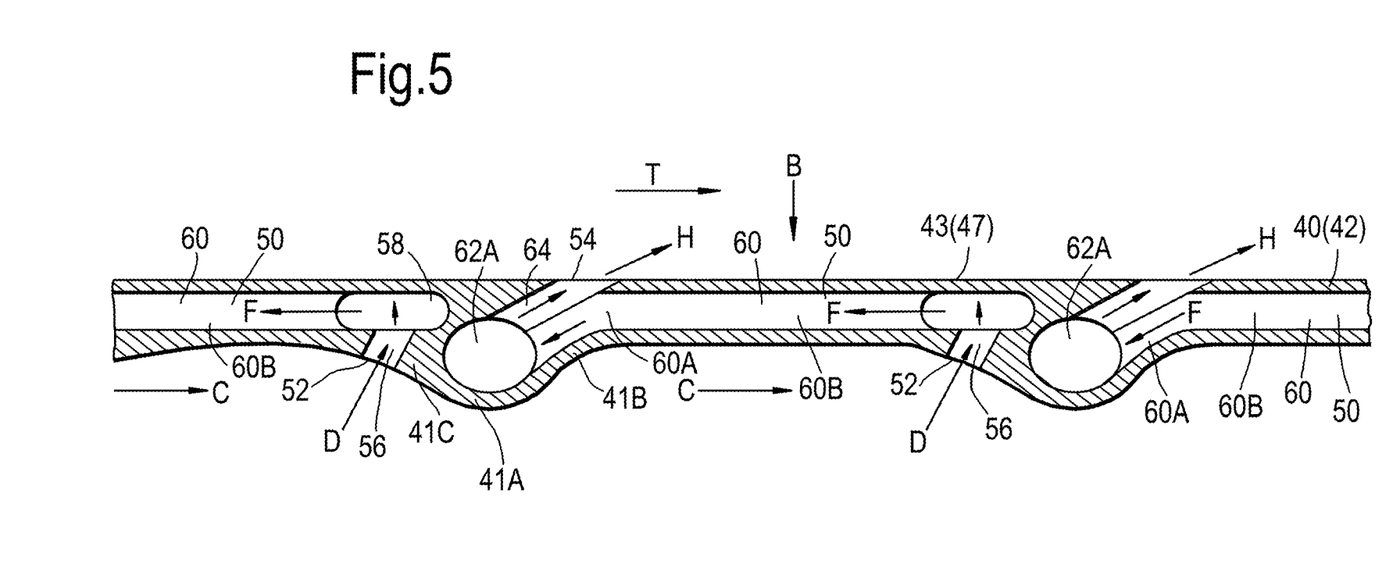
FIG. 5 is an alternative enlarged cross-sectional view through the cooled combustion chamber wall shown in FIG. 2.
Figure 6:
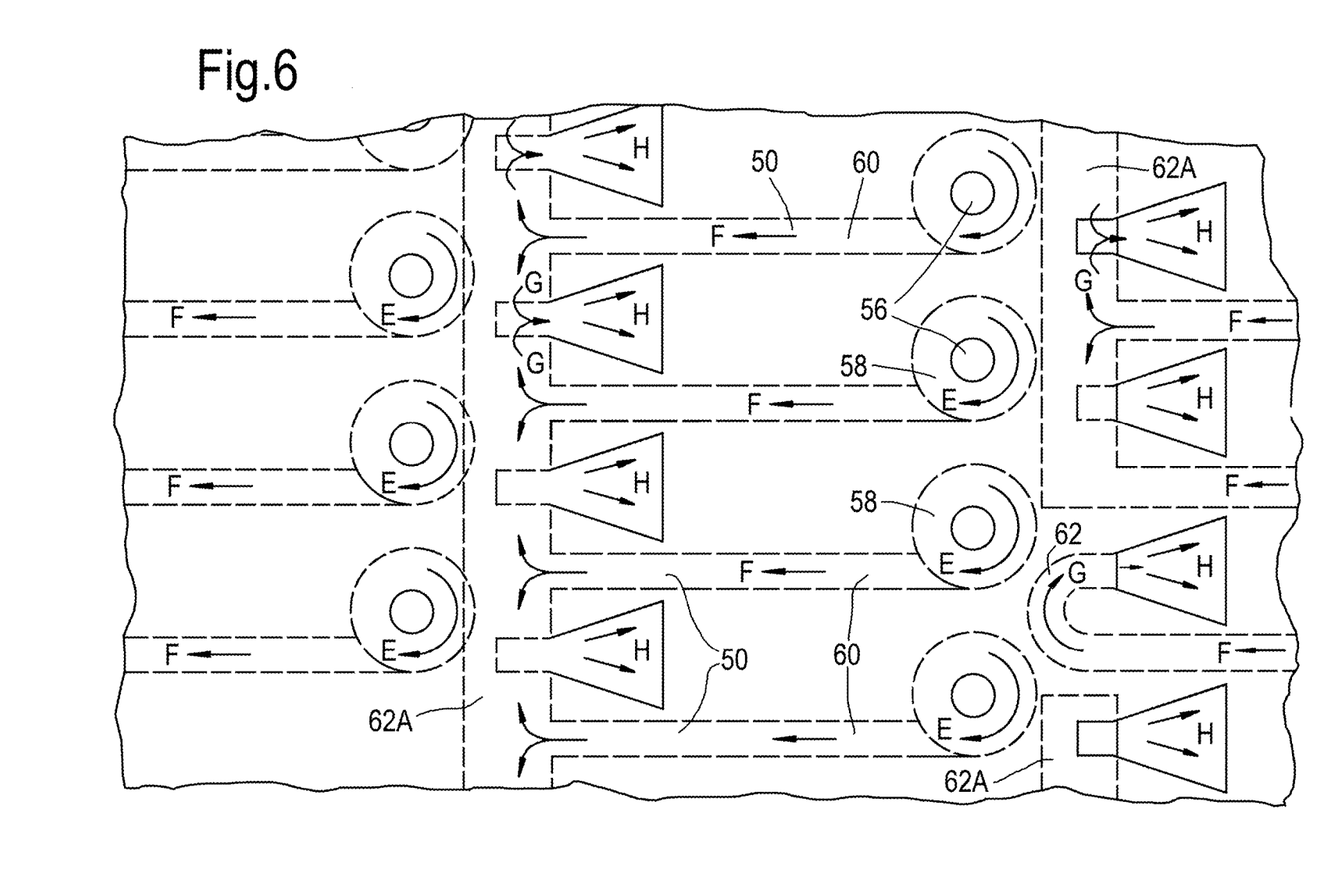
FIG. 6 is a view of the cooled combustion chamber wall in the direction of arrow B in FIG. 5.

An alternative radially inner annular wall 40 has a plurality of effusion cooling apertures 50 extending therethrough from the first surface 41 to the second surface 43, as shown more clearly in FIGS. 5 and 6. The effusion cooling apertures are substantially the same as those described with reference to FIGS. 3 and 4 and like parts are denoted by like numerals. The radially inner annular wall 40 differs in that the metering portion 60 of each effusion cooling aperture 50 in a row of effusion cooling apertures 50 is connected to a common plenum chamber 62A and the diffusing portion 64 of each effusion cooling aperture 50 in that row of effusion cooling apertures 50 is connected to the common plenum chamber 62A. Thus, the common plenum chamber 62A acts a U-shaped bend portion for all of the effusion cooling apertures 50 in that row of effusion cooling apertures 50.

Alternatively, the metering portion 60 of each one of a plurality of the effusion cooling apertures 50 in a row of effusion cooling apertures 50 may be connected to a common plenum chamber 62A and the diffusing portion 64 of each one of the plurality of the effusion cooling apertures 50 is connected to the common plenum chamber 62A and the common plenum chamber 62A forms a U-shaped bend portion for each one of the plurality of effusion cooling apertures 50 in that row of effusion cooling apertures 50. Thus, there may be a plurality of common plenum chambers 62A in a row of effusion cooling apertures 50 and each common plenum chamber 62A forms a U-shaped bend portion for a plurality of effusion cooling apertures 50.

Additionally, it may be possible to have an arrangement of the effusion cooling apertures 50 in a row of effusion cooling apertures 50 in which there are one or more common plenum chambers 62A forming U-shaped bend portions for a plurality of associated effusion cooling apertures 50 and one or more effusion cooling apertures 50 which comprise U-shaped bend portions 62, as shown by the row of effusion cooling apertures 50 at the right hand side of FIG. 6.

In this example the inlet portion 56, the metering portion 60 and the U-shaped bend portion 62 of the effusion cooling apertures 50 are circular in cross section.

The arrangement described with reference to FIGS. 5 and 6 may also be used for the radially outer annular wall 42.

Figure 7:
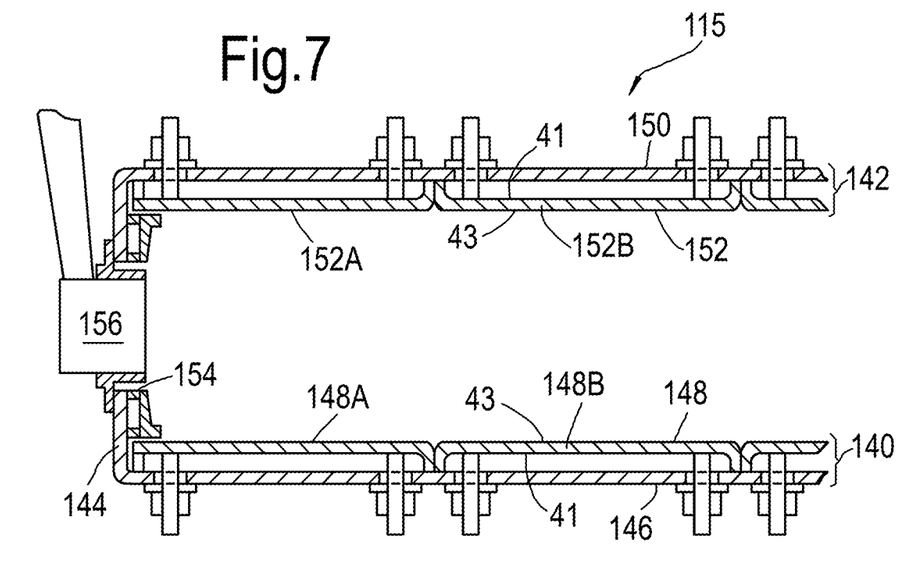
FIG. 7 is an enlarged cross-sectional view of an alternative cooled combustion chamber wall according to the present disclosure.
Figure 8:
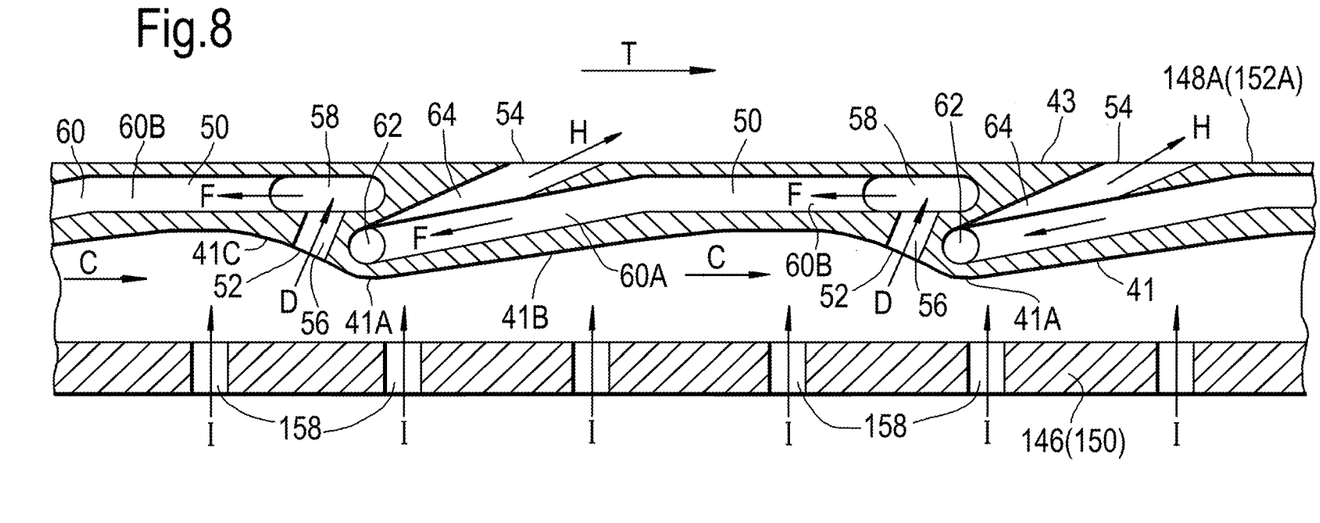
FIG. 8 is an enlarged cross-sectional view through the cooled combustion chamber wall shown in FIG. 7.

Another combustion chamber 115, as shown more clearly in FIGS. 7 and 8, is an annular combustion chamber and comprises a radially inner annular wall structure 140, a radially outer annular wall structure 142 and an upstream end wall structure 144. The radially inner annular wall structure 140 comprises a first annular wall 146 and a second annular wall 148. The radially outer annular wall structure 142 comprises a third annular wall 150 and a fourth annular wall 152. The second annular wall 148 is spaced radially from and is arranged radially around the first annular wall 146 and the first annular wall 146 supports the second annular wall 148. The fourth annular wall 152 is spaced radially from and is arranged radially within the third annular wall 150 and the third annular wall 150 supports the fourth annular wall 152. The upstream end of the first annular wall 146 is secured to the upstream end wall structure 144 and the upstream end of the third annular wall 150 is secured to the upstream end wall structure 144. The upstream end wall structure 144 has a plurality of circumferentially spaced apertures 154 and each aperture 154 has a respective one of a plurality of fuel injectors 156 located therein. The fuel injectors 156 are arranged to supply fuel into the annular combustion chamber 115 during operation of the gas turbine engine 10.

The second annular wall 148 comprises a plurality of rows of combustor tiles 148A and 148B and the fourth annular wall 152 comprises a plurality of rows of combustor tiles 152A and 152B. The combustor tiles 148A and 148B have threaded studs and nuts to secure the combustor tiles 148A and 148B onto the first annular wall 146 and the combustor tiles 152A and 152B have threaded studs and nuts to secure the combustor tiles 152A and 152B onto the third annular wall 150. Alternatively, the combustor tiles 148A and 148B may be secured to the first annular wall 146 by threaded bosses and bolts and the combustor tiles 152A and 152B may be secured to the third annular wall 150 by threaded bosses and bolts.

The combustor tiles 148A, 148B, 152A and 152B are cooled components of the turbofan gas turbine engine 10. Each of the combustor tiles 148A, 148B, 152A and 152B has a first surface 41 and a second surface 43. The combustion chamber tiles 148A, 148B, 152A and 152B are for annular combustion chamber wall 140 and 142 and each combustion chamber tile 148A, 148B, 152A and 152B has effusion cooling apertures 50, as shown in FIGS. 3 and 4. The effusion cooling apertures 50 are arranged in axially spaced rows and the effusion cooling apertures 50 in each row are circumferentially spaced apart. The effusion cooling apertures 50 in each row are offset circumferentially from the effusion cooling apertures 50 in each adjacent row. In addition the first annular wall 146 and the third annular wall 150 are provided with a plurality of impingement cooling apertures 158 which are arranged to direct coolant, e.g. air, I onto the first surface 41 of the tiles 148A, 148B, 152A and 152B. The impingement cooling apertures 158 are generally arranged to extend perpendicularly through the first annular wall 146 and the third annular wall 150. The impingement cooling apertures 158 are generally arranged in rows in which the impingement cooling apertures 158 are circumferentially spaced and the impingement cooling apertures 158 in axially adjacent rows are circumferentially staggered. The corrugations 41A in the first surface 41 are axially spaced and extend circumferentially of the combustor tiles 148A, 148B, 152A and 152B. In this example the inlet portion 56, the metering portion 60 and the U-shaped bend portion 62 of the effusion cooling apertures 50 are circular in cross section.

Alternatively, the combustor tiles 148A, 148B, 152A and 152B may be provided with effusion cooling apertures 50 shown in FIGS. 5 and 6.

Figure 9:
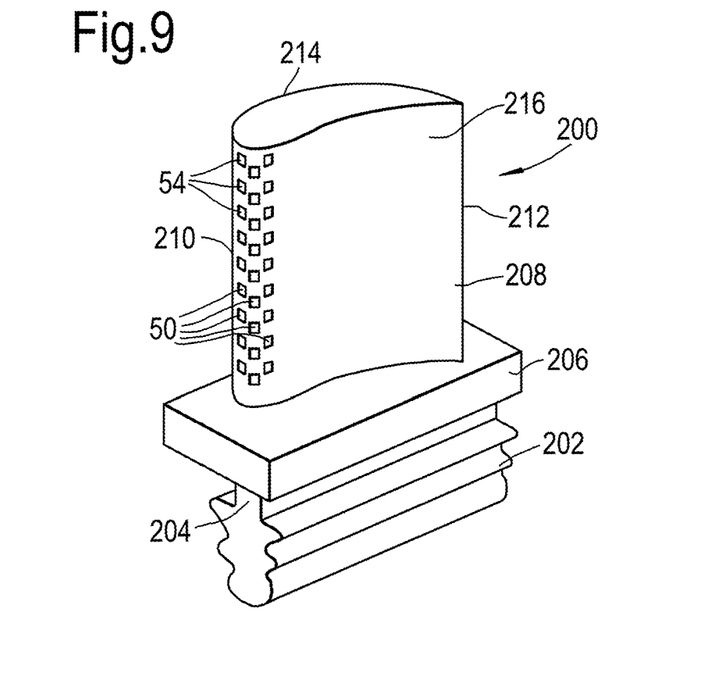
FIG. 9 is an enlarged perspective view of cooled turbine blade according to the present disclosure.

A turbine blade 200, as shown more clearly in FIG. 9, comprises a root portion 202, a shank portion 204, a platform portion 206 and an aerofoil portion 208. The aerofoil portion 208 has a leading edge 210, a trailing edge 212, convex wall 214 and a concave wall 216 and the convex and concave walls 214 and 216 extend from the leading edge 210 to the trailing edge 212. The turbine blade 200 is hollow and has a plurality of passages formed therein and is a cooled component of the gas turbine engine 10. The cooled turbine blade 200 has a plurality of effusion cooling apertures 50 extending through the convex and concave walls 214 and 216 respectively of the aerofoil portion 208 to cool the aerofoil portion 208 of the turbine blade 200. The effusion cooling apertures 50 are the same as those shown in FIGS. 3 and 4 or the same as those in FIGS. 5 and 6. The effusion cooling apertures 50 are arranged in axially spaced rows and the apertures 50 in each row are radially spaced apart. The effusion cooling apertures 50 in each row are offset radially from the effusion cooling apertures 50 in each adjacent row. The corrugations 41A in the first surface 41 are axially spaced and extend radially of the turbine blade 200. It may also be possible to provide the effusion cooing apertures 50 in the platform portion 206 of the turbine blade 200.

It is to be noted that the inlet 52 of each effusion cooling aperture 50 is axially downstream of the U-shaped bend portion 62, 62A of the effusion cooling aperture 50 and the outlet 54 of each effusion cooling aperture 50 is axially downstream of the U-shaped bend portion 62, 62A of the effusion cooling aperture 50.

In operation coolant, for example air supplied from the high pressure compressor 14 of the gas turbine engine 10, is supplied into the passages within the turbine blade 200 and the coolant flows through the serpentine flow path through the effusion cooling apertures 50, as described previously, from the first surface 41 to the second surface 43 of the convex and concave walls 214 and 216 respectively of the aerofoil portion 208. The flow of coolant through the effusion cooling apertures 50 exits the effusion cooling apertures 50 and then flows over the second surfaces 43 of the convex and concave walls 214 and 216 respectively of the aerofoil portion 208 to form a film of coolant on the second surfaces 43 of the convex and concave walls 214 and 216 respectively of the aerofoil portion 208.

Figure 10:
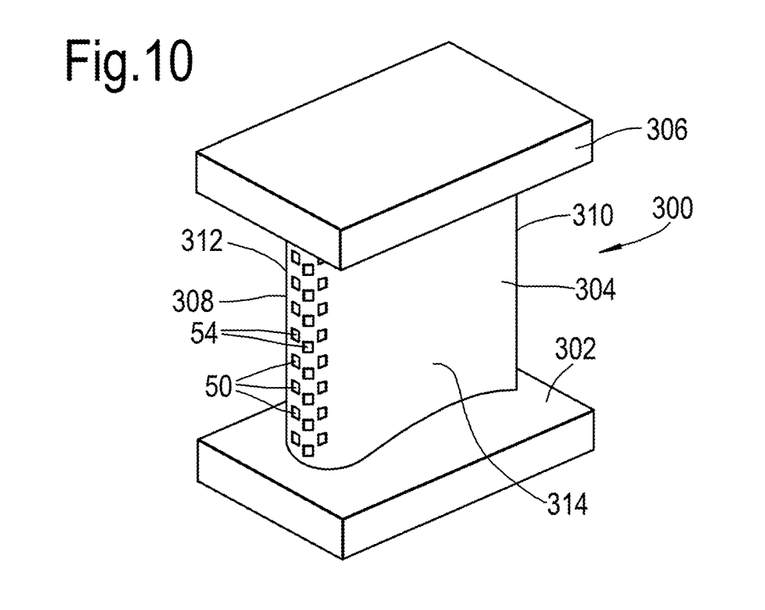
FIG. 10 is an enlarged perspective view of a cooled turbine vane according to the present disclosure.

A turbine vane 300, as shown more clearly in FIG. 10, comprises an inner platform portion 302, an aerofoil portion 304 and an outer platform portion 306. The aerofoil portion 304 has a leading edge 308, a trailing edge 310, convex wall 312 and a concave wall 314 and the convex and concave walls 312 and 314 extend from the leading edge 308 to the trailing edge 310. The turbine vane 300 is hollow and has a plurality of passages formed therein and is a cooled component of the gas turbine engine 10. The cooled turbine vane 300 has a plurality of effusion cooling apertures 50 extending through the convex and concave walls 312 and 314 respectively of the aerofoil portion 304 to cool the aerofoil portion 304 of the turbine vane 300. The effusion cooling apertures 50 are the same as those shown in FIGS. 3 and 4 or the same as those in FIGS. 5 and 6. The effusion cooling apertures 50 are arranged in axially spaced rows and the apertures 50 in each row are radially spaced apart. The effusion cooling apertures 50 in each row are offset radially from the effusion cooling apertures 50 in each adjacent row. The corrugations 41A in the first surface 41 are axially spaced and extend radially of the turbine vane 300. It may also be possible to provide the effusion cooing apertures 50 in the inner platform 302 and/or the outer platform portion 306 of the turbine vane 300.

It is to be noted that the inlet 52 of each effusion cooling aperture 50 is axially downstream of the U-shaped bend portion 62, 62A of the effusion cooling aperture 50 and the outlet 54 of each effusion cooling aperture 50 is axially downstream of the U-shaped bend portion 62, 62A of the effusion cooling aperture 50.

In operation coolant, for example air supplied from the high pressure compressor 14 of the gas turbine engine 10, is supplied into the passages within the turbine vane 300 and the coolant flows through the serpentine flow path through the effusion cooling apertures 50, as described previously, from the first surface 41 to the second surface 43 of the convex and concave walls 312 and 314 respectively of the aerofoil portion 304. The flow of coolant through the effusion cooling apertures 50 exits the effusion cooling apertures 50 and then flows over the second surfaces 43 of the convex and concave walls 312 and 314 respectively of the aerofoil portion 304 to form a film of coolant on the second surfaces 43 of the convex and concave walls 312 and 314 respectively of the aerofoil portion 304.

The turbine blade 200 may additionally have effusion cooling apertures in the platform portion 206 and/or the turbine vane 300 may additionally have effusion cooling apertures in the inner and/or outer platform portions 302 and 304 respectively.

The present disclosure is also applicable to the turbine shrouds which surround the turbine blades.

The advantage of the present disclosure is that it provides improved cooling effectiveness for thin walled components.

In FIGS. 3 to 6 and 8 the outlets 54 are isosceles trapezium shape. Each outlet 54 is arranged such that two of the sides of the isosceles trapezium shape extend laterally and two of the sides of the isosceles trapezium shape extend longitudinally and laterally. In the case of a combustion wall, or a combustion tile, two of the sides of the isosceles trapezium shape which extend laterally extend circumferentially of the combustor wall 40 or combustor tile 148A, 148B, 152A and 152B, and the two of the sides of the isosceles trapezium shape which extend longitudinally and laterally extend axially and circumferentially of the combustor wall 40 or combustor tile 148A, 148B, 152A. In the case of a turbine blade, or a turbine vane, two of the sides of the isosceles trapezium shape which extend laterally extend radially of the turbine blade 200 or turbine vane 300, and the two of the sides of the rectangular shape which extend longitudinally and laterally extend axially and radially of the turbine blade 200 or turbine vane 300.

In another arrangement, not shown, an annular combustion chamber wall comprises a plurality of wall segments and each of the combustion chamber wall segments is a cooled component of the gas turbine engine. Each combustion chamber wall segment forms a predetermined angular portion of the annular combustion chamber wall and the combustion chamber wall segments are arranged circumferentially side by side to form the annular combustion chamber wall. Each combustion chamber wall segment, is similar to the arrangement shown in FIGS. 7 and 8, and comprises an outer wall and an inner wall spaced from the outer wall, the outer wall has a plurality of impingement cooling apertures and the inner wall has a plurality of effusion cooling apertures as shown in FIG. 8. The effusion cooling apertures are arranged in axially spaced rows and the apertures in each row are circumferentially spaced apart. The effusion cooling apertures in each row are offset circumferentially from the effusion cooling apertures in each adjacent row. The combustion chamber wall segments may have lands, e.g. pedestals, pins, fins, extending from the inner wall to the outer wall and joining the inner wall to the outer wall. The impingement cooling apertures may be circular, elliptical or slotted, e.g. rectangular, in cross-section. The impingement cooling apertures may have a shaped, curved, inlet to form a bell-mouth inlet.

The cooled combustion chamber walls in FIG. 2 may be manufactured by direct laser deposition in a powder bed by producing a spiral shaped wall sintering the powder metal layer by layer, (in the longitudinal, axial, direction of the wall) and then unravelling and welding, bonding, brazing or fastening the ends of what was the spiral shaped wall together to form an annular combustion chamber wall. The combustion chamber tiles of FIG. 7 may be manufactured by direct laser deposition in a powder bed by sintering the powder metal layer by layer in the longitudinal, axial, direction of the combustion chamber tile. The combustion chamber segments may be manufactured by direct laser deposition in a powder bed by sintering the powder metal layer by layer in the longitudinal, axial, direction of the combustion chamber tile.

Additive layer manufacturing enables the effusion cooling apertures to have diffusing portions which incline the resultant effusion flow of coolant closer to the surface of the wall of the cooled component and to diffuse the flow of coolant to reduce the exit velocity of the coolant. The effusion cooling apertures diffuse the flow of coolant in a direction perpendicular, normal, to the surface of the cooled component. The corrugations in the surface of the wall increase the heat transfer from the surface. Each effusion cooling aperture has an increased length compared to conventional effusion cooling apertures and hence has a greater internal surface area for the coolant to extract heat from the component. The effusion cooling apertures may be positioned downstream of mixing, or dilution, ports in combustion chamber walls to rapidly regenerate a film of coolant on the second surface of the wall.

Figure 11:
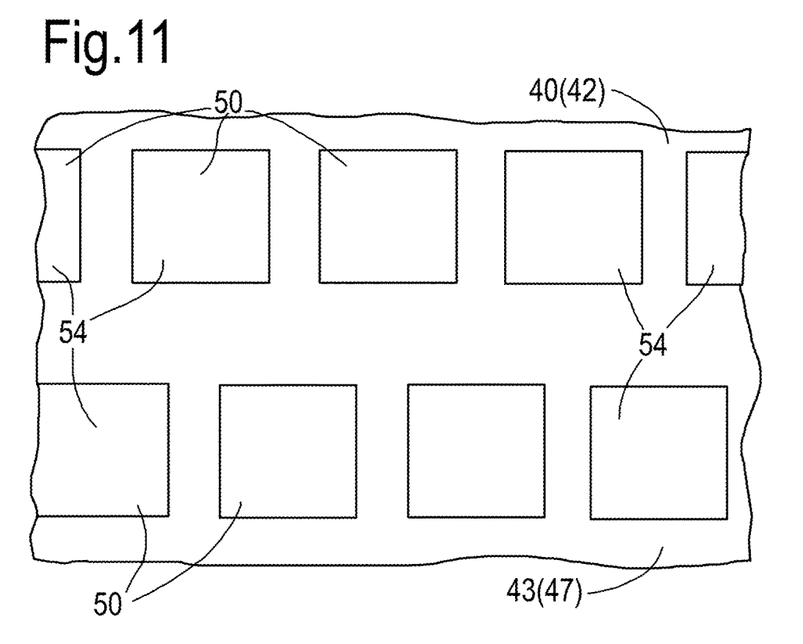
FIG. 11 is an alternative view of the cooled combustion chamber wall in the direction of arrow A in FIG. 3.
Figure 12:
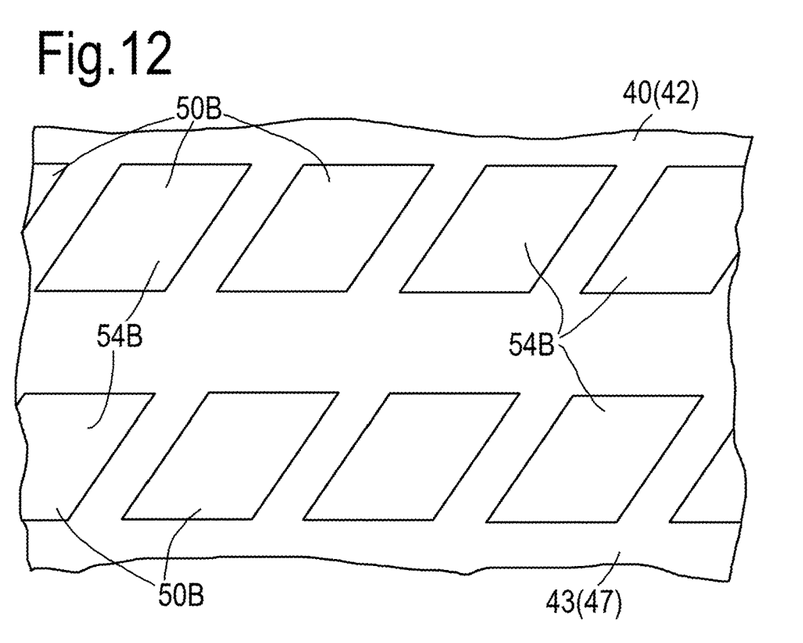
FIG. 12 is a further view of the cooled combustion chamber wall in the direction of arrow A in FIG. 3.

FIGS. 11 and 12 show other suitable shapes for outlets 54 of the effusion cooling apertures 50.

FIG. 11 shows rectangular or square outlets 54 for the effusion cooling apertures 50 whereas FIG. 11 shows rhombus shaped outlets 50B. In FIG. 10 each outlet 54 is arranged such that two of the sides of the rectangular shape extend laterally and two of the sides of the rhombus shape extend longitudinally. In the case of a combustion wall, or a combustion tile, two of the sides of the rectangular shape which extend laterally extend circumferentially of the combustor wall 40 or combustor tile 148A, 148B, 152A and 152B, and the two of the sides of the rectangular shape which extend longitudinally extend axially of the combustor wall 40 or combustor tile 148A, 148B, 152A. In the case of a turbine blade, or a turbine vane, two of the sides of the rectangular shape which extend laterally extend radially of the turbine blade 200 or turbine vane 300, and the two of the sides of the rectangular shape which extend longitudinally extend axially of the turbine blade 200 or turbine vane 300.

In FIG. 12 each outlet 54B is arranged such that two of the sides of the rhombus shape extend laterally and two of the sides of the rhombus shape extend longitudinally and laterally. In the case of a combustion wall, or a combustion tile, two of the sides of the rhombus shape which extend laterally extend circumferentially of the combustor wall 40 or combustor tile 148A, 148B, 152A and 152B, and the two of the sides of the rhombus shape which extend longitudinally and laterally extend axially and circumferentially of the combustor wall 40 or combustor tile 148A, 148B, 152A. In the case of a turbine blade, or a turbine vane, two of the sides of the rhombus shape which extend laterally extend radially of the turbine blade 200 or turbine vane 300, and the two of the sides of the rhombus shape which extend longitudinally and laterally extend axially and radially of the turbine blade 200 or turbine vane 300.

Although the present disclosure has described and shown the inlet portion, the metering portion and the U-shaped bend portion of the effusion cooling apertures as being circular in cross section it is equally possible for the inlet portion, the metering portion and the U-shaped bend portion of the effusion cooling apertures to have other suitable cross sectional shapes for example elliptical or oval or gothic arch in cross-section.

Although the present disclosure has described and shown the diffusion portion and the collection chamber of each effusion cooling aperture arranged at the same lateral side of the metering portion, it is equally possible for the diffusing portion and the collection chamber of each effusion cooling aperture to be arranged at opposite lateral sides of the metering portion of the effusion cooling aperture.

The outlets of the effusion cooling apertures may have a rectangular shape, a square shape, a parallelogram shape, a rhombus shape or an isosceles trapezium shape.

Although the present disclosure has described and shown the inlet portions arranged at an acute angle to the collection chambers it is equally possible for the inlet portions to be arranged perpendicularly to the collection chambers. If the inlet portions are arranged perpendicular to the collection chambers it is possible to arrange the inlet portions to be displaced from the middle, or axis, of the collection chambers so as to help the coolant flow around the collection chambers to prevent debris collecting in the collection chambers.

Although the present disclosure has described and shown the inlets of the effusion cooling apertures arranged in the corrugations in the first surface of the wall it is equally possible for the inlets of some of the effusion cooling apertures to be arranged between corrugations in the first surface of the wall. Although the present disclosure has described and shown the collection chambers of the effusion cooling apertures aligned with the corrugations in the first surface of the wall it is equally possible for the collection chambers of some of the effusion cooling apertures to be arranged between the corrugations in the first surface of the wall.

The cooled component may be a turbine blade, a turbine vane, a combustion chamber wall, a combustion chamber tile, a combustion chamber heat shield, a combustion chamber wall segment or a turbine shroud.

The cooled component may comprise a superalloy, for example a nickel based superalloy, a cobalt based superalloy or an iron based superalloy.

The cooled component may be manufactured by additive layer manufacturing, for example by direct laser deposition, powder bed laser deposition, selective laser sintering or selective laser melting.

The cooled component may be a gas turbine engine component or other turbomachine component, e.g. a steam turbine, or an internal combustion engine etc.

The gas turbine engine may be an aero gas turbine engine, an industrial gas turbine engine, a marine gas turbine engine or an automotive gas turbine engine. The aero gas turbine engine may be a turbofan gas turbine engine, a turbo-shaft gas turbine engine, a turbo-propeller gas turbine engine or a turbojet gas turbine engine.

The inlet portion of each effusion cooling aperture may be circular in cross-section. The U-Bend portion of each effusion cooling aperture may be circular in cross-section. The metering portion of each effusion cooling aperture may be circular in cross-section.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A cooled component comprising a wall having a first surface and a second surface, the wall having a plurality of effusion cooling apertures extending there-through from the first surface to the second surface, each effusion cooling aperture having an inlet in the first surface and an outlet in the second surface, each effusion cooling aperture comprising an inlet portion, a collection chamber, a metering portion, a U-shaped bend portion and a diffusing portion arranged in flow series from the inlet to the outlet, the inlet portion of each effusion cooling aperture being arranged substantially perpendicularly to a surface of the collection chamber, the metering portion of each effusion cooling aperture being arranged to extend in a longitudinal direction from a lateral side of the collection chamber, the lateral side being displaced from the inlet portion in a lateral direction that is perpendicular to the longitudinal direction and parallel to a plane of the second surface of the wall, the diffusing portion of each effusion cooling aperture being arranged at an angle to the second surface, each outlet having a quadrilateral shape in the plane of the second surface of the wall and each outlet being displaced laterally from the metering portion, the U-shaped bend portion of each effusion cooling aperture being a most upstream portion of the effusion cooling aperture, the outlet of each effusion cooling aperture being downstream of the U-shaped bend portion, the inlet of each effusion cooling aperture being downstream of the U-shaped bend portion.

2. A cooled component as claimed in claim 1, wherein each collection chamber having a circular cross-section.

3. A cooled component as claimed in claim 2, wherein each inlet portion being aligned with an axis of the circular cross-section collection chamber.

4. A cooled component as claimed in claim 2, wherein the metering portion of each effusion cooling aperture being arranged to extend substantially tangentially from the collection chamber.

5. A cooled component as claimed in claim 1, wherein the diffusing portion and the collection chamber of each effusion cooling aperture being arranged at a same lateral side of the metering portion of the effusion cooling aperture.

6. A cooled component as claimed in claim 1, wherein the diffusing portion of at least one of the plurality of effusion cooling apertures being arranged laterally between the metering portion of the at least one effusion cooling aperture and the metering portion of a laterally adjacent one of the plurality of effusion cooling apertures.

7. A cooled component as claimed in claim 6, wherein the diffusing portion of each one of a group of the plurality of effusion cooling apertures being arranged laterally between the metering portion of that effusion cooling aperture and the metering portion of a laterally adjacent one of the plurality of effusion cooling apertures.

8. A cooled component as claimed in claim 1, wherein the metering portion of at least one of the plurality of effusion cooling apertures being arranged laterally between the diffusing portion of the at least one effusion cooling aperture and the diffusing portion of a laterally adjacent one of the plurality of effusion cooling apertures.

9. A cooled component as claimed in claim 8, wherein the metering portion of each one of a group of the plurality of effusion cooling apertures being arranged laterally between the diffusing portion of that effusion cooling aperture and the diffusing portion of a laterally adjacent one of the plurality of effusion cooling apertures.

10. A cooled component as claimed in claim 1, wherein each outlet having a rectangular shape, a parallelogram shape, a rhombus shape or an isosceles trapezium shape.

11. A cooled component as claimed in claim 1, wherein each outlet having a fan shape in the plane of the second surface of the wall.

12. A cooled component as claimed in claim 1, wherein the plurality of effusion cooling apertures being arranged in longitudinally spaced rows and the effusion cooling apertures in each row being laterally spaced apart and the effusion cooling apertures in each row being offset laterally from the effusion cooling apertures in each adjacent row.

13. A cooled component as claimed in claim 1, wherein the first surface having corrugations and the corrugations are longitudinally spaced.

14. A cooled component as claimed in claim 13, wherein the U-shaped bend portion of each effusion cooling aperture being aligned longitudinally with a corresponding one of the corrugations in the first surface of the wall.

15. A cooled component as claimed in claim 13, wherein the inlet of at least one of the plurality of effusion cooling apertures being arranged between the corrugations in the first surface of the wall.

16. A cooled component as claimed in claim 15, wherein the collection chamber of at least one of the plurality of effusion cooling apertures being arranged between the corrugations in the first surface of the wall.

17. A cooled component as claimed in claim 13, wherein the inlet of at least one of the plurality of effusion cooling apertures being arranged in the corrugations in the first surface of the wall.

18. A cooled component as claimed in claim 17, wherein the collection chamber of at least one of the plurality of effusion cooling apertures being aligned with the corrugations in the first surface of the wall.

19. A cooled component as claimed in claim 1, wherein the metering portion of each one of a group of the plurality of effusion cooling apertures being connected to a common plenum chamber and the diffusing portion of each one of the group of effusion cooling apertures is connected to the common plenum chamber.

20. A cooled component as claimed in claim 1, wherein the cooled component is selected from the group consisting of a turbine blade, a turbine vane, a combustion chamber wall, a combustion chamber tile, a combustion chamber heat shield, a combustion chamber wall segment and a turbine shroud.

21. A cooled component as claimed in claim 1, wherein the cooled component comprising a superalloy, the superalloy being selected from the group consisting of a nickel based superalloy, a cobalt based superalloy and an iron based superalloy.

22. A cooled component as claimed in claim 1, wherein the cooled component is selected from the group consisting of a gas turbine engine component, a turbomachine component and an internal combustion engine component.

23. A cooled component as claimed in claim 1, wherein the collection chamber of each effusion cooling aperture is positioned downstream of the outlet of the effusion cooling aperture.

24. A method of manufacturing a cooled component, the cooled component comprising a wall having a first surface and a second surface, the wall having a plurality of effusion cooling apertures extending there-through from the first surface to the second surface, each effusion cooling aperture having an inlet in the first surface and an outlet in the second surface, each effusion cooling aperture comprising an inlet portion, a collection chamber, a metering portion, a U-shaped bend portion and a diffusing portion arranged in flow series from the inlet to the outlet, the inlet portion of each effusion cooling aperture being arranged substantially perpendicularly to a surface of the collection chamber, the metering portion of each effusion cooling aperture being arranged to extend in a longitudinal direction from a lateral side of the collection chamber, the lateral side being displaced from the inlet portion in a lateral direction that is perpendicular to the longitudinal direction and parallel to a plane of the second surface of the wall, the diffusing portion of each effusion cooling aperture being arranged at an angle to the second surface, each outlet having a quadrilateral shape in the plane of the second surface of the wall and each outlet being displaced laterally from the metering portion, the U-shaped bend portion of each effusion cooling aperture being a most upstream portion of the effusion cooling aperture, the outlet of each effusion cooling aperture being downstream of the U-shaped bend portion, the inlet of each effusion cooling aperture being downstream of the U-shaped bend portion, wherein the method comprises manufacturing the cooled component by additive layer manufacturing.

25. A method as claimed in claim 24, wherein the method is selected from the group consisting of direct laser deposition, powder bed laser deposition, selective laser sintering and selective laser melting.

26. A cooled component comprising a wall having a first surface and a second surface, the wall having a plurality of effusion cooling apertures extending there-through from the first surface to the second surface, each effusion cooling aperture having an inlet in the first surface and an outlet in the second surface, each effusion cooling aperture comprising an inlet portion, a collection chamber, a metering portion, a U-shaped bend portion and a diffusing portion arranged in flow series from the inlet to the outlet, the inlet portion of each effusion cooling aperture being arranged substantially perpendicularly to a surface of the collection chamber, the metering portion of each effusion cooling aperture being arranged to extend in a longitudinal direction from a lateral side of the collection chamber, the lateral side being displaced from the inlet portion in a lateral direction that is perpendicular to the longitudinal direction and parallel to a plane of the second surface of the wall, the diffusing portion of each effusion cooling aperture being arranged at an angle to the second surface, each outlet having a quadrilateral shape in the plane of the second surface of the wall and each outlet being displaced laterally from the metering portion, the inlet and the outlet being spaced longitudinally in a same direction from the U-shaped bend portion.

* * * * *